United States Patent [19]
Cucksee et al.

[11] 3,974,004
[45] Aug. 10, 1976

[54] EXTENSION OF POT LIFE OF HTPB COMPOSITE PROPELLANTS BY PHOSPHINE OXIDES

[75] Inventors: Marjorie T. Cucksee, Huntsville; Henry C. Allen, Decatur, both of Ala.

[73] Assignee: The United States of America as represented by the Secretary of the Army, Washington, D.C.

[22] Filed: Feb. 4, 1974

[21] Appl. No.: 439,151

[52] U.S. Cl. .............................. 149/7; 149/19.4; 149/19.9; 149/20; 149/113
[51] Int. Cl.² .................. C06B 45/34; C06B 45/10; C06B 45/08
[58] Field of Search ............ 149/19.4, 19.9, 7, 20, 149/113; 260/887; 252/429 B, 437

[56] References Cited
UNITED STATES PATENTS

| | | | |
|---|---|---|---|
| 3,087,844 | 4/1963 | Hudson | 149/19.9 |
| 3,418,184 | 12/1968 | Vetter | 149/19.9 |
| 3,477,988 | 11/1969 | Ostrozynski | 260/46.5 |
| 3,585,090 | 6/1971 | Sayles | 149/19.9 |
| 3,640,898 | 2/1972 | Su | 252/429 B |
| 3,692,600 | 9/1972 | Sayles | 149/19.9 |
| 3,745,074 | 7/1973 | Allen | 149/19.9 |
| 3,762,972 | 10/1973 | Allen | 149/19.9 |
| 3,791,888 | 2/1974 | Hudson | 149/19.9 |
| 3,830,672 | 8/1974 | Lista | 149/19.9 |
| 3,847,882 | 11/1974 | Baldwin | 149/19.9 |

FOREIGN PATENTS OR APPLICATIONS 2,016,133  4/1970  Germany

Primary Examiner—Samuel W. Engle
Assistant Examiner—Donald P. Walsh
Attorney, Agent, or Firm—Nathan Edelberg; Robert P. Gibson; Jack W. Voigt

[57] ABSTRACT

Trioctylphosphine oxide and tributylphosphine oxide are representative of the phosphine oxide compounds which are utilized in isocyanate curable composite propellant compositions to extend usable pot life required for mixing and processing of the specified compositions. The compositions are comprised of a binder of hydroxy terminated liquid polymer systems, (e.g. hydroxy terminated polybutadiene and the like) optional selected plasticizers, optional metal fuel, and the inorganic oxidizer, ammonium perchlorate, that is substantially of very fine particle size (less than 20 microns).

10 Claims, 3 Drawing Figures

EXTENSION OF POT LIFE OF HTPB COMPOSITE PROPELLANTS BY PHOSPHINE OXIDES

DEDICATORY CLAUSE

The invention described herein may be manufactured, used, and licensed by or for the Government for governmental purposes without the payment to us of any royalties thereon.

BACKGROUND OF THE INVENTION

High burning rate propellants have been formulated with very fine oxidizer particle sizes; however, the very fine particle sizes (less than 20 microns) result in decreased usable pot life. The usable pot life is the time available for accomplishing the processing steps of mixing and casting propellant before the propellant loses its fluid nature.

Earlier work in propellant technology has resulted in development of reaction products formed from reacting di- or tri-functional aziridinyl phosphine oxides or their derivatives with polyfunctional carboxylic acids. These reaction products have been used to coat inorganic oxidizer particles which are used in propellant compositions, and when so used, the coated particles enhance the mechanical properties of the propellant. U.S. Pat. No. 3,762,972, issuing on Oct. 2, 1973, and its divisional application issuing as U.S. Pat. No. 3,745,074 on July 10, 1973, teach the process of preparation, the products produced, the products coated on ammonium perchlorate, and the coated ammonium perchlorate in propellant compositions. When the propellant compositions containing the described coated ammonium perchlorate are cured, the mechanical properties, particularly the strain at break and tensile strength, are greatly improved at 77°F as well as at −40°F. The propellant compositions contained, generally, a 50—50 blend of very fine particle size ammonium perchlorate (17 micron nominal diameter) and larger particle size ammonium perchlorate (200 micron nominal diameter). The processing of this type blend of oxidizer particles can be accomplished without major problems relating to mixing and pot life.

The advantage of using substantially all very fine ammonium perchlorate in propellant compositions has been demonstrated with respect to improved burn rates. The problems encountered when using very fine ammonium perchlorate, however, which relate to mixing and retaining proper pot life, have required much effort to be devoted to determining what can be done to permit using high percentage of fine ammonium perchlorate while retaining proper pot life for mixing and casting the propellant.

In our copending application Ser. No. 385,930, filed July 27, 1973, the problems of reduced pot life of isocyanate curable propellant compositions were substantially improved by the use of the reaction products formed from tri-functional aziridinylphosphine oxides or their derivatives reacted with monofunctional carboxylic acids, the tri-aziridinyl derivatives of triazine, the tri-aziridinyl derivatives of benzenetriacyl, the aziridine compound N-phenethylaziridine, and selected alkyl diaziridine compounds. The compositions are comprised of a binder of hydroxy terminated liquid polymer systems, (e.g. hydroxy terminated polybutadiene and the like) optional selected plasticizers, optional metal fuel, and the inorganic oxidizer, ammonium perchlorate, that is substantially of very fine particle size (less than 20 microns). The compositions can employ a liquid ferrocene burning rate catalyst or fine $Fe_2O_3$ burning rate catalyst.

In high rate propellant, very fine uncoated AP is typically used in conjunction with liquid burn rate catalysts which are notorious cure accelerators and detriments to usable pot life. After the discovery of the catalytic effect of fine AP, it was believed that some of the cure catalysis formerly attributed to the burn rate catalysts was in fact derived from the AP or possibly even a synergistic effect between the burn rate catalyst and the AP. A series of propellant mixes was made with and without aziridine AP coatings, and with and without Catocene, a liquid ferrocene burn rate catalyst. Again it was found that the aziridine coating (precoated on the AP in this series) greatly increased the pot life. Very fine $Fe_2O_3$ burn rate catalyst has a similar effect on pot life by acting as a cure accelerator. Although pot life has been extended by aziridine coatings, further extension of pot life would be advantageous for certain propellants.

It is desirable to have an additive for propellant compositions which extends the pot life of propellant compositions employing either coated or uncoated ammonium perchlorate and with or without liquid ferrocene burn rate catalysts or fine particle size $Fe_2O_3$ burn rate catalyst.

Therefore, an object of this invention is to provide an additive which extends the pot life of an isocyanate curable propellant composition that employs fine ammonium perchlorate precoated with a selected aziridine compound selected from n-phenethylaziridine (PEA), tris 1(2 methylaziridinyl)phosphine oxide (MAPO), or an adduct (MT4) formed from reacting together 2.0 moles of tris 1(2 methylaziridinyl)phosphine oxide, 0.7 mole adipic acid, and 0.3 mole tartaric acid.

Another object of this invention is to provide an additive which extends the pot life of an isocyanate curable propellant composition employing very fine uncoated ammonium perchlorate.

A further object of this invention is to provide an additive which extends the pot life of an isocyanate curable propellant composition which employs a burn rate catalyst.

SUMMARY OF THE INVENTION

It has been discovered that trioctylphosphine oxide and tributylphosphine oxide extend the pot life of isocyanate curable propellant compositions when used as an additive to the propellant composition mix or when used to prior coat the ammonium perchlorate oxidizer that is used in the propellant composition.

DESCRIPTION OF THE PREFERRED EMBODIMENT

Figure 1:
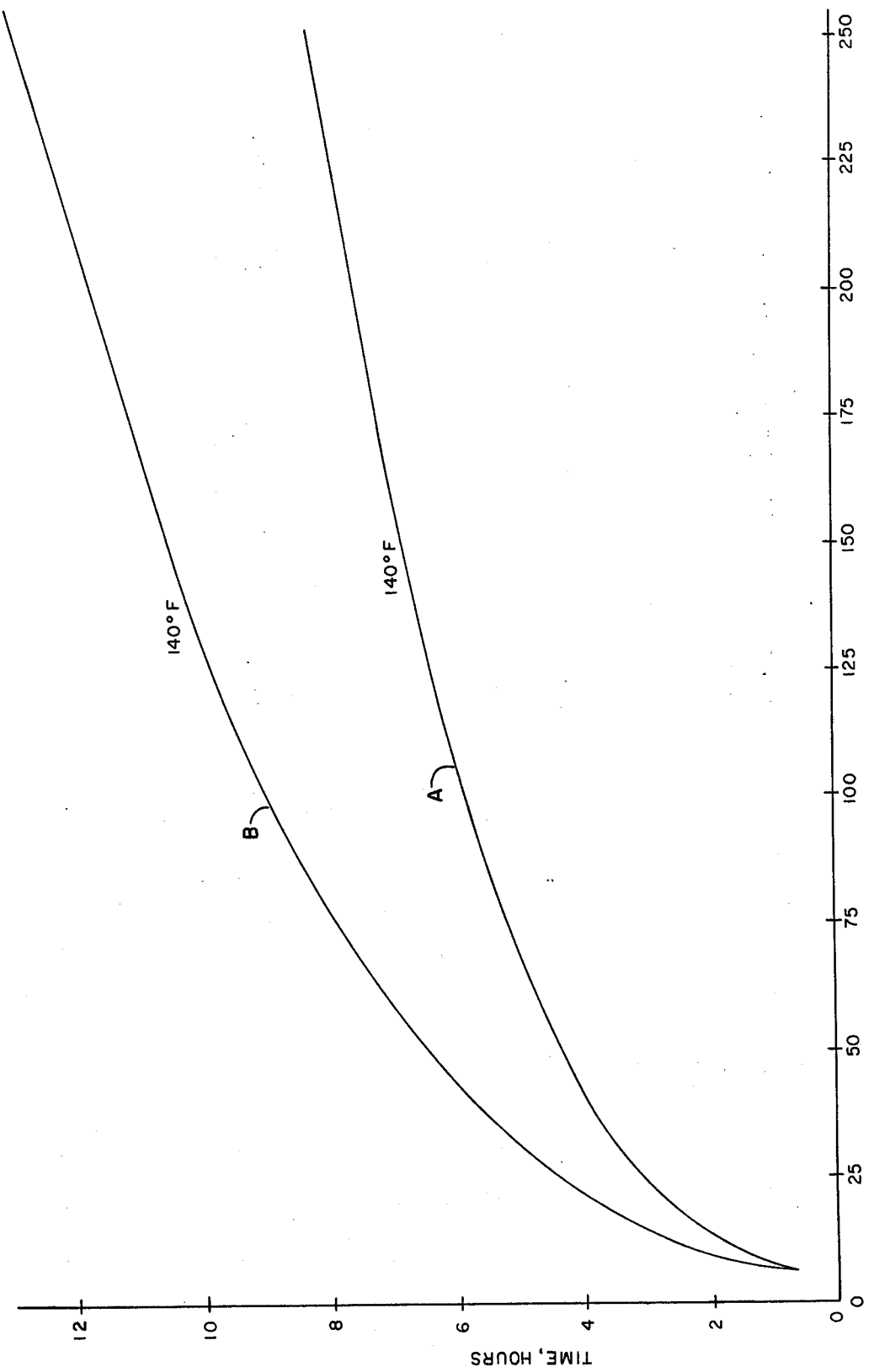
FIGS. 1–3 are graphs which depict viscosities in poises or kilopoises versus time in hours for a propellant binder and propellant compositions employing tributylphosphine oxide as an additive to extend pot life.

It has been discovered that an additive of a trialkyl phosphine oxide compound, in an amount from about 0.1 to about 0.3 weight percent of an isocyanate curable propellant composition, extends the usable pot life required for mixing and processing of the specified composition. Trioctylphosphine oxide and tributylphosphine oxide are representative of the trialkyl phosphine oxide compounds which extend usable pot life.

A viscosity versus time curve for a typical propellant binder (no solid filler) was run at 140°F. A second curve was run for the same binder containing 1.0% TBPO. It had previously been determined that the end of propellant pot life (40 Kps) for this particular propellant composition corresponds to a binder viscosity of 125 poises. The graph (A) of the drawing shows that the control binder reached 125 poises in 6 ½ hours. The viscosity of the propellant binder with 1.0% TBPO reached 125 poises in about 10 hours as shown by graph (B). When related to the propellant viscosity and pot life, a corresponding relationship exists as further explained below.

For example, the propellant employing a liquid ferrocene catalyst (such as Catocene) and using AP coated with from 0.05 to about 0.60% by weight of PEA, MT4, or MAPO had a pot life (time to reach 40 Kps) of 8 ½ hours. However, with the same combination, 0.1% TBPO additive extended the pot life to 19 ⅛ hours. Thus, TBPO as an additive for extending pot life is equally effective in the binder or in the propellant composition with binder and other ingredients combined, including liquid ferrocene additive.

Figure 2:
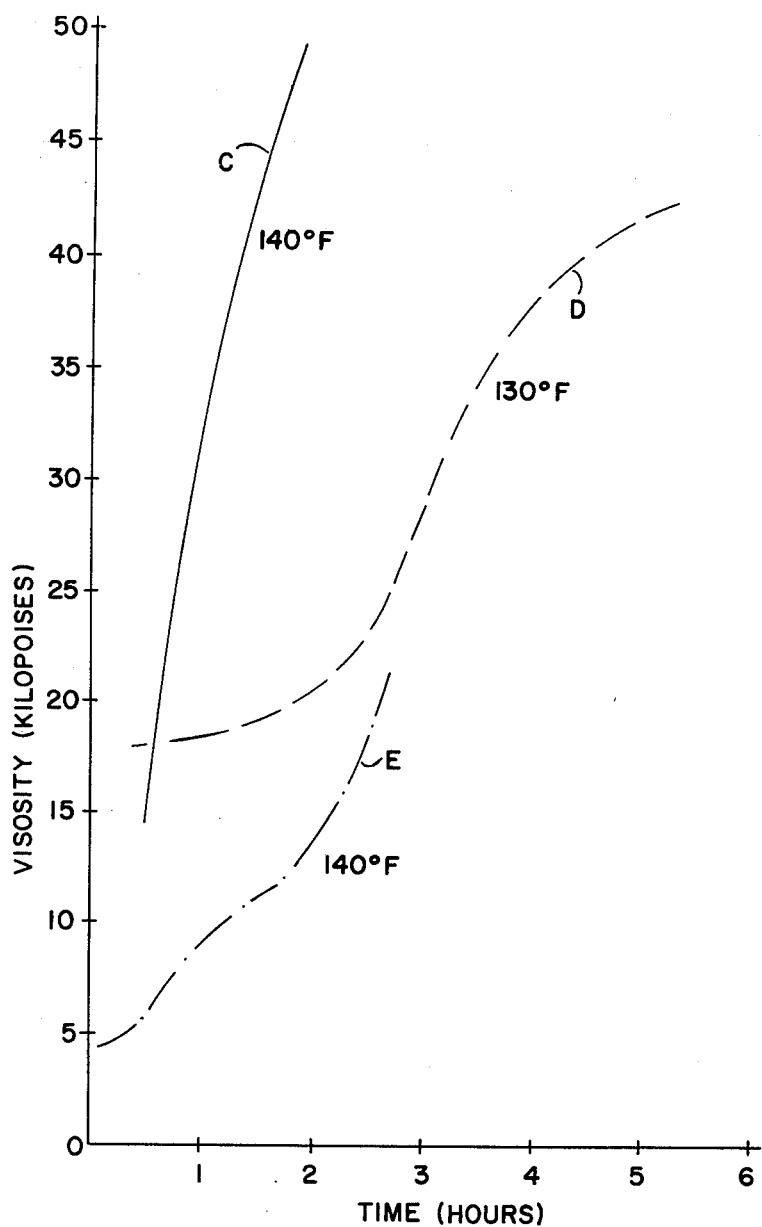
Figure 3:
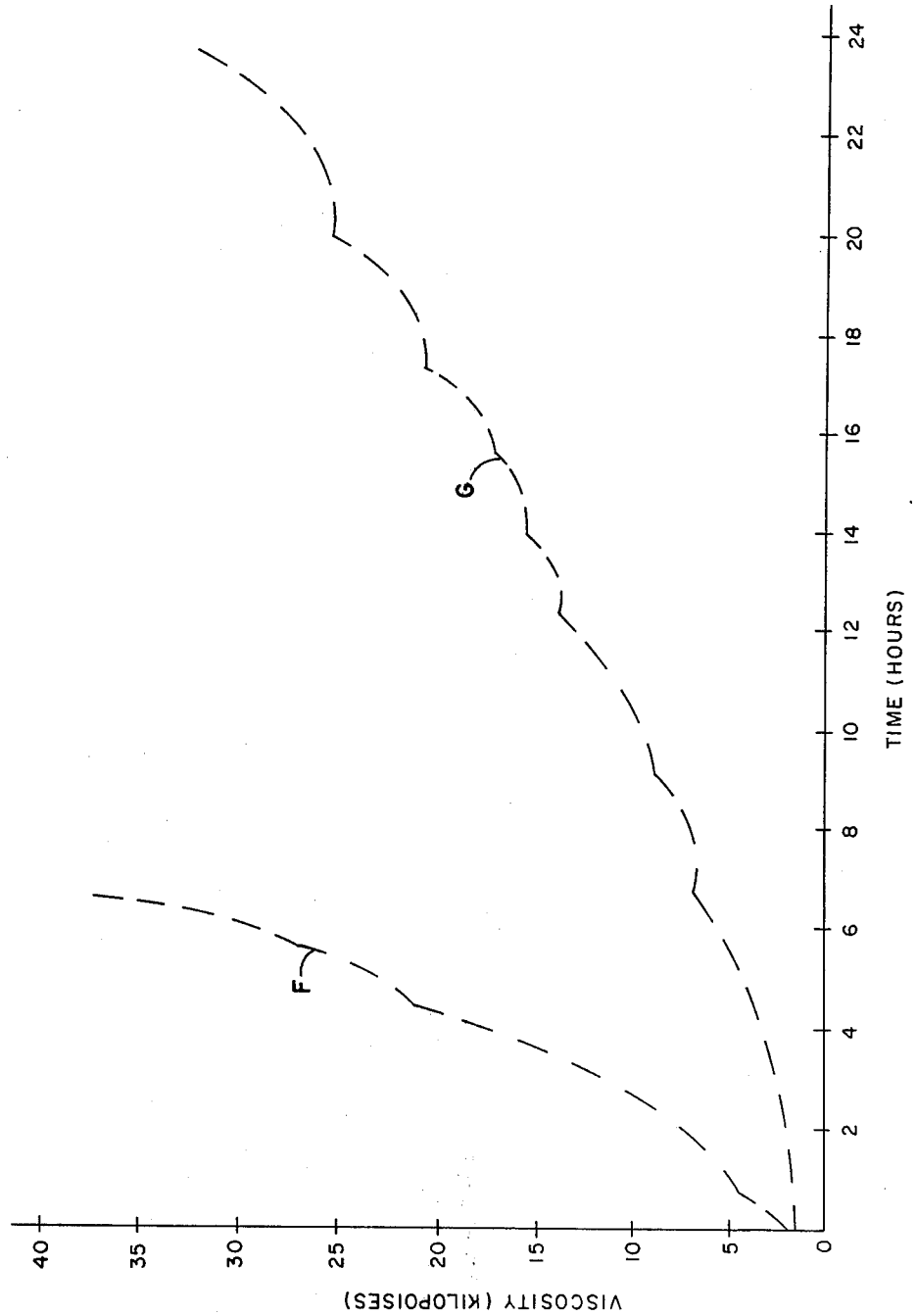

The graphs of the drawing are described as follows. FIG. 1 graphs relate to a propellant binder of hydroxy terminated polybutadiene. FIGS. 2 and 3 relate to propellant compositions employing a hydroxy terminated polybutadiene binder.

In FIG. 2, graphs C, D, and E illustrate effect of $Fe_2O_3$ and TBPO on hydroxy terminated propellants without MT4. The Figure, Graph D, shows that TBPO is effective in extending pot life for the propellant composition containing $Fe_2O_3$. Graphs C and E serve as a basis of comparison to show the sharp increase in viscosity to end pot life in less than 2 and 3 hours respectively where no TBPO is included.

In FIG. 3, graphs F and G further illustrate the effects of uncoated AP and TBPO precoated AP on viscosities of propellant compositions. Graph G shows that a precoat of AP with TBPO extends the pot life of a propellant composition as compared with AP with no coating and no TBPO in the same propellant.

The cure catalysis function of ammonium perchlorate in propellants is believed to be related to the effective surface area of the ammonium perchlorate; that is, the greater the surface area, the faster the cure rate, with a corresponding increase in rate of viscosity rise. Thus, the coating of the fine ammonium perchlorate with the phosphine oxide compounds inhibits or prevents the catalysis of the urethane type reaction (isocyanate-hydroxyl reaction) thus greatly extending the time available for processing and casting propellant.

We claim:

1. An isocyanate curable composite propellant composition having extended pot life, said composition comprised of hydroxy terminated polybutadiene binder, an isocyanate curing agent, inorganic oxidizer consisting of ammonium perchlorate of less than 20 micron particle size, and an additive that is effective in extending pot life of said composition in an amount from about 0.1 to about 0.3 weight percent, said additive selected from the trialkyl phosphine oxides consisting of trioctylphosphine oxide and tributylphosphine oxide.

2. The propellant composition of claim 1 wherein said ammonium perchlorate is precoated with from 0.05 to about 0.60% by weight of tris 1(2 methylaziridinyl)phosphine oxide; said additive is tributylphosphine oxide in an amount of about 0.1% by weight.

3. The propellant composition of claim 2 wherein a liquid ferrocene burn rate catalyst is included as an additional ingredient in said composition.

4. The propellant composition of claim 1 wherein said ammonium perchlorate is precoated with from about 0.05 to about 0.60% by weight of an adduct of 2.0 moles of tris 1(2 methylaziridinyl) phosphine oxide, 0.7 mole adipic acid, and 0.3 mole tartaric acid; said additive is tributylphosphine oxide in an amount of about 0.1% by weight.

5. The propellant composition of claim 4 wherein a liquid ferrocene burn rate catalyst is included as an additional ingredient in said composition.

6. The propellant composition of claim 1 wherein said ammonium perchlorate is precoated with from about 0.05 to about 0.60% by weight of n-phenethylaziridine; said additive is tributylphosphine oxide in an amount of about 0.1% by weight.

7. The propellant composition of claim 6 wherein a liquid ferrocene burn rate catalyst is included as an additional ingredient in said composition.

8. The propellant composition of claim 1 wherein said ammonium perchlorate is precoated with from about 0.05 to about 0.60% by weight of an adduct of 2.0 moles of tris 1(2 methylaziridinyl)phosphine oxide, 0.7 mole adipic acid, and 0.3 mole tartaric acid; said additive is trioctylphosphine oxide.

9. The propellant composition of claim 1 wherein said ammonium perchlorate is precoated with from about 0.05 to about 0.60% by weight of tris 1 (2 methylaziridinyl) phosphine oxide; said additive is trioctylphosphine oxide.

10. The propellant composition of claim 1 wherein said ammonium perchlorate is precoated with from about 0.05 to about 0.60% by weight of n-phenethylaziridine; said additive is trioctylphosphine oxide.

* * * * *